(12) United States Patent
Amit

(10) Patent No.: US 10,168,500 B2
(45) Date of Patent: Jan. 1, 2019

(54) OPTICAL SUBASSEMBLY FOR AN OPTICAL RECEIVER, OPTICAL RECEIVER AND TRANSCEIVER COMPRISING THE SAME, AND METHODS OF MAKING AND USING THE SAME

(71) Applicant: Source Photonics (Chengdu) Company Limited, Chengdu (CN)

(72) Inventor: Moshe Amit, West Hills, CA (US)

(73) Assignee: Source Photonics (Chengdu) Co., Ltd., Chengdu (CN)

( * ) Notice: Subject to any disclaimer, the term of this patent is extended or adjusted under 35 U.S.C. 154(b) by 32 days.

(21) Appl. No.: 15/324,959

(22) PCT Filed: Jan. 6, 2017

(86) PCT No.: PCT/CN2017/070479
§ 371 (c)(1),
(2) Date: Jan. 9, 2017

(87) PCT Pub. No.: WO2018/058859
PCT Pub. Date: Apr. 5, 2018

(65) Prior Publication Data
US 2018/0196209 A1     Jul. 12, 2018

Related U.S. Application Data

(60) Provisional application No. 62/402,764, filed on Sep. 30, 2016.

(51) Int. Cl.
*H04B 10/60* (2013.01)
*G02B 6/42* (2006.01)
(Continued)

(52) U.S. Cl.
CPC ............ *G02B 6/4298* (2013.01); *G02B 6/42* (2013.01); *G02B 6/4206* (2013.01);
(Continued)

(58) Field of Classification Search
CPC ...... G02B 6/4204; G02B 6/4206; H04B 10/67
See application file for complete search history.

(56) References Cited

U.S. PATENT DOCUMENTS

| 8,335,411 B2 | 12/2012 | Kuznia et al. |
| 8,475,057 B2 | 7/2013 | Kihara et al. |
| (Continued) | | |

FOREIGN PATENT DOCUMENTS

| CN | 101995624 A | 3/2011 |
| CN | 102169214 A | 8/2011 |
| (Continued) | | |

OTHER PUBLICATIONS

International Search Report and Written Opinion; International Searching Authority/CN dated Jun. 28, 2017; International Application No. PCT/CN2017/070479; 12 pgs.; State Intellectual Property Office of the P.R. China; Beijing, China.
(Continued)

*Primary Examiner* — Nathan M Cors
(74) *Attorney, Agent, or Firm* — Andrew D. Fortney; Central California IP Group, P.C.

(57) ABSTRACT

An optical subassembly, optical or optoelectronic receivers and transceivers including the same, and methods of making and using the same are disclosed. The optical subassembly includes a mirror configured to reflect an incoming optical signal at a first predetermined angle, a lens configured to receive the incoming optical signal from the mirror and focus the incoming optical signal onto a target, and an optical mount comprising at least one first surface configured to support the mirror, at least one second surface configured to support and/or secure the lens at a second predetermined angle, and a structural block configured to position and/or arrange (i) the at least one first surface at a third predetermined angle related to the first predetermined angle and (ii) the at least one second surface at the first (Continued)

and/or second predetermined angle. The first and/or second predetermined angle(s) are adapted to reduce a reflectance of the incoming optical signal.

20 Claims, 7 Drawing Sheets

(51) Int. Cl.
*H04B 10/40* (2013.01)
*H04B 10/58* (2013.01)
*H04B 10/69* (2013.01)

(52) U.S. Cl.
CPC ......... *G02B 6/4214* (2013.01); *G02B 6/4246* (2013.01); *G02B 6/4261* (2013.01); *H04B 10/40* (2013.01); *H04B 10/58* (2013.01); *H04B 10/691* (2013.01)

(56) References Cited

U.S. PATENT DOCUMENTS

| | | | |
|---|---|---|---|
| 8,724,944 | B2 | 5/2014 | Kuznia et al. |
| 9,448,372 | B2 | 9/2016 | Tsai et al. |
| 2005/0047726 | A1 | 3/2005 | Hodgeson |
| 2011/0044593 | A1 | 2/2011 | Kihara et al. |
| 2011/0097037 | A1* | 4/2011 | Kuznia ................ G02B 6/4214 385/33 |
| 2013/0094026 | A1 | 4/2013 | Kuznia et al. |
| 2015/0309270 | A1 | 10/2015 | Tsai et al. |
| 2016/0323038 | A1* | 11/2016 | Zhou ...................... H04B 10/40 |
| 2017/0048015 | A1* | 2/2017 | O'Daniel ............. G02B 6/4219 |

FOREIGN PATENT DOCUMENTS

| | | |
|---|---|---|
| CN | 103185931 A | 7/2013 |
| CN | 103676028 A | 3/2014 |
| CN | 104597575 A | 5/2015 |
| CN | 105093430 A | 11/2015 |
| JP | 2010164856 A | 7/2010 |

OTHER PUBLICATIONS

Zhaohong Cai et al; "Light coupling element and light module using same"; Bibliographic Data of CN105093430 (A); Nov. 25, 2015; http://worldwide.espacenet.com.

* cited by examiner

OPTICAL SUBASSEMBLY FOR AN OPTICAL RECEIVER, OPTICAL RECEIVER AND TRANSCEIVER COMPRISING THE SAME, AND METHODS OF MAKING AND USING THE SAME

RELATED APPLICATION(S)

The present application is a national phase application of International Application No. PCT/CN2017/070479, filed Jan. 6, 2017, which claims priority to U.S. Provisional Pat. Appl. No. 62/402,764, filed Sep. 30, 2016.

FIELD OF THE INVENTION

The present invention relates to the field of optical communications, especially to optical subassemblies for optical receivers, optical and/or optoelectronic receivers and/or transceivers including the same, and methods of making and using the same.

DISCUSSION OF THE BACKGROUND

In optical communications, optical signals carry information. For example, a transmitter (e.g., a laser or laser diode) in an optical or optoelectronic transceiver converts one or more electrical signals into optical signals, and a receiver (e.g., a photodiode) in an optical or optoelectronic transceiver converts one or more optical signals into electrical signals. One objective of optical communication research and development is to increase and/or maximize bandwidth (e.g., the amount of information transmitted) to the greatest extent possible. Another objective is to communicate the information with as few errors or losses as possible.

In a number of conventional designs, the optics in an optical or optoelectronic receiver includes a mirror at a 45° angle relative to the incoming optical signal and a lens placed at a 90° angle relative to the incoming optical signal. The mirror reflects the incoming optical signal towards the lens, and the lens focuses the optical signal onto a photodetector. However, the lens and/or other components in the optical path of the incoming optical signal may reflect some of the light (e.g., back along the optical path). This reflected light can interfere with the incoming optical signal, and in the worst case, damage components of the receiver and/or network. Interference from reflected light can cause errors in signal processing and/or losses of data in the receiver.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention is intended to overcome one or more deficiencies in the prior art, and provide an optical subassembly, optical receivers and transceivers including the same, and methods of making and using the same are disclosed. The optical subassembly includes a mirror configured to reflect an incoming optical signal at a first predetermined angle, a lens configured to receive the incoming optical signal from the mirror and focus the incoming optical signal onto a target, and an optical mount comprising at least one first surface configured to support the mirror, at least one second surface configured to support and/or secure the lens at a second predetermined angle, and a structural block configured to position and/or arrange (i) the first surface(s) at a third predetermined angle related to the first predetermined angle and (ii) the second surface(s) at the first and/or second predetermined angle(s). The first and/or second predetermined angles are adapted to reduce a reflectance of the incoming optical signal (e.g., from the lens and/or a filter and/or photodetector further along the optical path of the incoming optical signal). For example, the first predetermined angle may be from 94° to 120° with respect to the incoming optical signal, and the second predetermined angle may be from 5° to 30° with respect to a plane that is orthogonal to the incoming optical signal prior to reflection by the mirror. In general, the incoming optical signal may be polarized or unpolarized.

In various embodiments, the mirror generally comprises a non-selective (or total reflectance) mirror configured to reflect the optical signal impinging thereon. For example, the non-selective mirror may be configured to reflect the incoming optical signal towards the lens. In other or further embodiments of the optical subassembly, the third predetermined angle may be from 30° to 43° with respect to the incoming optical signal. Alternatively, an axis normal or perpendicular to the first surface may be from 47° to 60° with respect to the incoming optical signal. In either case, the first predetermined angle may be 180°—two times the third predetermined angle.

In alternative or additional embodiments, the optical mount comprises (i) a base configured to secure the optical mount to an inner surface of an optical cavity (e.g., in an optical or optoelectronic receiver) and (ii) a support structure orthogonal to an upper surface of the base. The support structure may be configured to support at least the first surface. In some embodiments, the optical mount comprises a first bar or extension that is orthogonal to the support structure and that comprises the first surface, and the second surface(s) is/are in a cutout or opening in the base. In an alternative embodiment, the optical mount comprises second and third bars or extensions that are orthogonal to the support structure and that comprise the second surface, a third surface coplanar with the first surface, and a fourth surface parallel or perpendicular to the second surface. The third surface may be configured to further support the mirror, and the fourth surface may be configured to further support and/or secure the lens. For example, the optical mount may further comprise a second bar or extension that comprises the second surface and optionally a third bar or extension that comprises (i) a third surface that is coplanar with the first surface and that is also configured to support the mirror and (ii) a fourth surface that is parallel or perpendicular to the second surface and that may be configured to further support and/or secure the lens.

Further embodiments of the present optical subassembly are for a multi-channel optical or optoelectronic receiver, in which the optical subassembly further comprises a filter configured to reflect a second channel of the incoming optical signal at a fourth predetermined angle and allow the first channel of the incoming optical signal to pass through, and a second lens configured to receive the second channel of the incoming optical signal from the filter and focus the incoming optical signal onto a second target (e.g., a photodetector, such as a photodiode). In such a multi-channel optical subassembly, the optical mount further comprises at least one fifth surface configured to support the filter, at least one sixth surface configured to support and/or secure the second lens at a fifth predetermined angle, and a second structural block configured to position and/or arrange (i) the fifth surface at a sixth predetermined angle related to the fourth predetermined angle and (ii) the sixth surface at the fifth or sixth predetermined angle. The fifth and/or sixth predetermined angle(s) are adapted to reduce a reflectance of the second channel of the incoming optical signal.

A further aspect of the present invention relates to an optical or optoelectronic receiver, comprising the present optical subassembly, a photodetector, and a package or housing including an optical cavity configured to contain or enclose the optical subassembly and the photodetector. The photodetector is generally configured to receive the focused incoming optical signal and convert the focused incoming optical signal to an electrical signal. In some examples, the optical or optoelectronic receiver may further comprise a fiber adapter or connector configured to receive an optical fiber, and the optical fiber may receive the incoming optical signal from a network. In a further embodiment, the photodetector may comprise a photodiode, and the optical or optoelectronic receiver may further comprise one or more amplifiers (e.g., a transimpedance amplifier and/or a limiting amplifier) configured to amplify the electrical signal from the photodetector.

Another aspect of the present invention relates to an optical or optoelectronic transceiver, comprising the present optical or optoelectronic receiver, an optical or optoelectronic transmitter configured to generate an outgoing optical signal, and a second optical subassembly configured to output the outgoing optical signal through the fiber adapter or connector. The present invention may further relate to an optical or optoelectronic module that comprises the present optical or optoelectronic receiver or transceiver.

Another aspect of the present invention relates to a method of processing an optical signal, comprising reflecting an incoming optical signal at a first predetermined angle using a mirror, focusing the incoming optical signal onto a target using a lens configured to receive the incoming optical signal from the mirror, and processing the optical signal at the target. The mirror is supported by at least one first surface of an optical mount. The lens is supported and/or secured at a second predetermined angle by at least one second surface of the optical mount. The optical mount comprises a structural block configured to position and/or arrange the first surface at a third predetermined angle related to the first predetermined angle and the second surface at the second predetermined angle. The first and/or second predetermined angle(s) are adapted to reduce a reflectance of the incoming optical signal (e.g., from the lens and/or a filter and/or photodetector along the optical path of the incoming optical signal). The target may be a photodiode.

In certain embodiments, similar to the present optical subassembly, the mirror may be a total reflectance mirror, and the structural block may comprise (i) a base configured to secure the optical mount to an inner surface of an optical cavity and/or (ii) a support structure orthogonal to an upper surface of the base configured to support at least the first surface. The optical mount may comprise a first bar or extension that is orthogonal to the support structure and that comprises the first surface. In one embodiment, the base may comprise the second surface. In additional or alternative embodiments, the second surface(s) may be in a cutout or opening in the base, and/or the optical mount may comprise second and third bars or extensions that are orthogonal to the support structure and that comprise the second surface, a third surface and a fourth surface, as described above for the present optical subassembly.

As for the present optical subassembly, the third predetermined angle may be from 30° to 43° with respect to the incoming optical signal. Alternatively, an axis normal or perpendicular to the first surface may be from 47° to 60° with respect to the incoming optical signal. In either case, the first predetermined angle may be 180°—two times the third predetermined angle. The second predetermined angle may from 5° to 30° with respect to a plane that is orthogonal to the incoming optical signal prior to reflection by the mirror.

In some embodiments, the incoming optical signal is a multi-channel optical signal, and the method further comprises allowing a first channel of the multi-channel optical signal to pass through a filter and reflecting a second channel of the multi-channel optical signal at a fourth predetermined angle, focusing the second channel of the multi-channel optical signal onto a second target using a second lens, and processing the second channel of the optical signal at the second target. The first channel of the multi-channel optical signal is reflected by the mirror. The filter may be supported by at least one fifth surface of the optical mount, the second lens may be supported and/or secured at a fifth predetermined angle by at least one sixth surface of the optical mount, the optical mount may comprise a second structural block configured to position and/or arrange the fifth surface(s) at a sixth predetermined angle related to the fourth predetermined angle and the sixth surface(s) at the fifth predetermined angle, and/or the fifth and/or sixth predetermined angles may be adapted to reduce a reflectance of the second channel of the incoming optical signal.

Yet another aspect of the present invention relates to a method of making an optical subassembly, comprising forming an optical mount, mounting or affixing a mirror on first and second surfaces of the optical mount, and mounting, affixing or securing a lens in the optical mount. The lens is configured to receive the reflected incoming optical signal from the mirror and focus the reflected incoming optical signal onto a target. The optical mount comprises (i) at least one first surface configured to support a mirror, (ii) at least one second surface configured to support and/or secure a lens, and (iii) a structural block configured to position and/or arrange the first surface(s) at a first predetermined angle and the second surface(s) at a second predetermined angle. The first and/or second predetermined angle is adapted to reduce a reflectance of a reflected incoming optical signal (e.g., from the lens). The mirror is configured to reflect an incoming optical signal at a third predetermined angle related to the first predetermined angle.

In various aspects of the method of making an optical subassembly, the third predetermined angle may be from 30° to 43° with respect to the incoming optical signal, and/or the second predetermined angle may be from 5° to 30° with respect to a plane that is orthogonal to the incoming optical signal prior to reflection by the mirror.

The present optical subassembly reduces reflectance of the incoming optical signal in the optical cavity of an optical or optoelectronic receiver relative to the prior art. This result is particularly important for optical or optoelectronic receivers that include a relatively small photodetector (e.g., a photodiode having a surface area of <20 $\mu m^2$ (e.g., ≤15 $\mu m^2$, 12 $\mu m^2$ or less, etc.). In addition, the present optical subassembly enables facile alignment of the incoming optical signal with a target (such as a photodiode) by adjusting a relatively large optical mount containing a lens, rather than the relatively small lens itself. These and other advantages of the present invention will become readily apparent from the detailed description of various embodiments below.

DETAILED DESCRIPTION

Figure 1A:
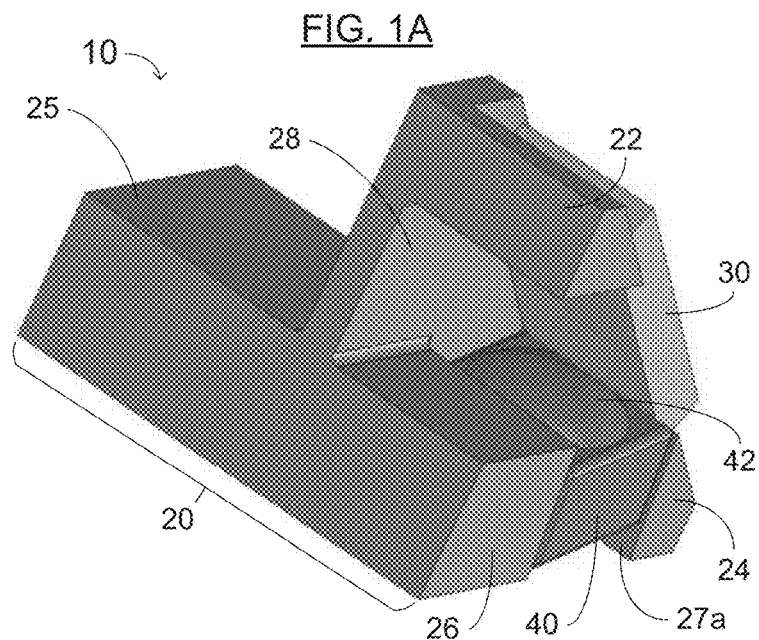
FIGS. 1A-B are diagrams showing an exemplary optical subassembly for an optical or optoelectronic receiver in accordance with an embodiment of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components and circuits have not been described in detail so as not to unnecessarily obscure aspects of the disclosure.

Some portions of the detailed descriptions which follow are presented in terms of processes, procedures, logic, functions and other symbolic representations of operations on signals, code, data bits or data streams within a computer, transceiver, processor, controller and/or memory. These descriptions and representations are generally used by those skilled in the data processing arts to effectively convey the substance of their work to others skilled in the art. A process, procedure, logic operation, function, process, etc., is herein, and is generally, considered to be a step or a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and/or otherwise manipulated in a computer, data processing system, optical component, or circuit. It has proven convenient at times, principally for reasons of common usage, to refer to these signals as bits, streams, values, elements, symbols, characters, terms, numbers, information or the like. It should be borne in mind, however, that all of these and similar terms are associated with the appropriate physical quantities and/or signals, and are merely convenient labels applied to these quantities and/or signals.

Unless specifically stated otherwise, or as will be apparent from the following discussions, it is appreciated that throughout the present application, discussions utilizing terms such as "processing," "operating," "calculating," "determining," or the like, refer to the action and processes of a computer, data processing system, or similar processing device (e.g., an electrical, optical, or quantum computing or processing device or circuit) that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data or information similarly represented as physical quantities within other components of the same or a different system or architecture.

Furthermore, in the context of this application, the terms "signal" and "optical signal" refer to any known structure, construction, arrangement, technique, method and/or process for physically transferring data or information from one point to another. Also, unless indicated otherwise from the context of its use herein, the terms "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

For the sake of convenience and simplicity, the terms "optical" and "optoelectronic" are generally used interchangeably herein, and use of either of these terms also includes the other, unless the context clearly indicates otherwise, but these terms are generally given their art-recognized meanings herein. Furthermore, the term "transceiver" refers to a device having at least one receiver and at least one transmitter, and use of the term "transceiver" also includes the individual terms "receiver" and/or "transmitter," unless the context clearly indicates otherwise. Also, for convenience and simplicity, the terms "connected to," "coupled with," "communicating with," "coupled to," and grammatical variations thereof (which terms also refer to direct and/or indirect relationships between the connected, coupled and/or communicating elements unless the context of the term's use unambiguously indicates otherwise) may be used interchangeably, but these terms are also generally given their art-recognized meanings.

In the present disclosure, a "major surface" of a structure or feature is a surface defined at least in part by the largest axis of the structure or feature (e.g., if the structure is round and has a radius greater than its thickness, the radial surface[s] is/are the major surface of the structure). In general, the length and width dimensions of a 3-dimensional object are the two largest dimensions of the object, and the thickness of a 3-dimensional object is the smallest dimension of the object, unless the context of the disclosure indicates otherwise.

Various embodiments and/or examples disclosed herein may be combined with other embodiments and/or examples, as long as such a combination is not explicitly disclosed herein as being unfavorable, undesirable or disadvanta-

An Exemplary Optical Subassembly

Figure 1B:
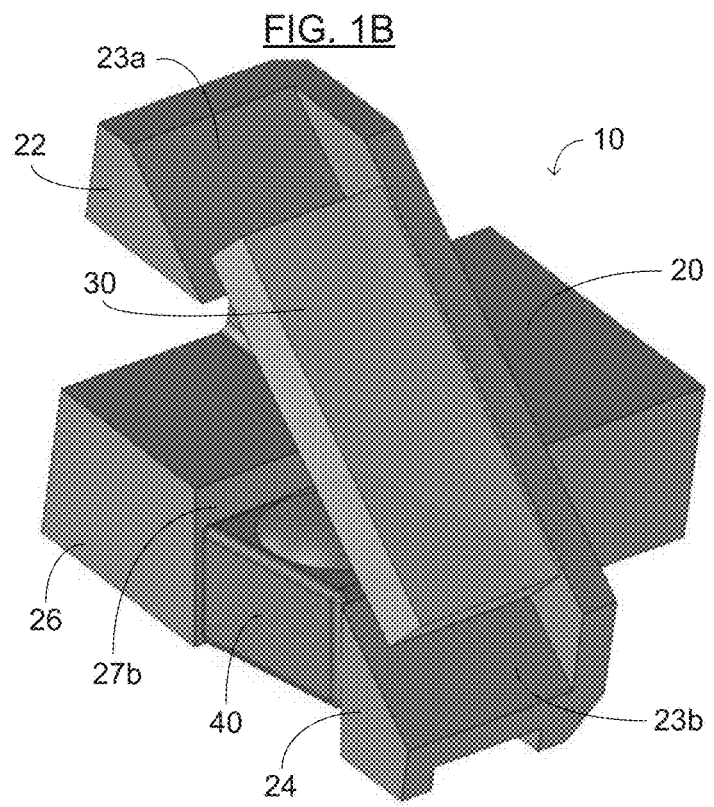

FIGS. 1A-B shows an exemplary optical subassembly 10 that includes an optical mount 20, a mirror 30, and a lens 42. The optical mount 20 includes a base 25, a support structure 28 orthogonal to the base 25, and first, second and third bars or extensions 22, 24 and 26 that are orthogonal to the support structure 28 and that are on an opposite side of the support structure 28 from the base 25. The mirror 30 is configured to reflect an incoming optical signal (not shown) at a first predetermined angle. The lens 42 is configured to receive the incoming optical signal from the mirror and focus the incoming optical signal onto a target, such as a photodiode. The lens 42 may be secured by and/or integral with a lens holder 40.

The mirror 30 generally comprises a non-selective (or total reflectance) mirror configured to reflect all or substantially all of the wavelengths of the optical signal impinging thereon. For example, the non-selective mirror may be configured to reflect the incoming optical signal towards the lens 42. In various embodiments, the mirror 30 comprises a metallic film or surface on a structural block having square or rectangular sides, but the mirror 30 may comprise a solid piece of a reflective material. The mirror 30 generally has length and width dimensions of about 1 cm or less (e.g., from 2 to 8 mm) and a thickness of about 3 mm or less (e.g., from 0.2 to 2 mm).

The lens comprises a ball lens 42 with flat orthogonal sides 40 (which may function as a holder for the lens), but other lenses (such as, but not limited to, a ball lens without flat sides, a half-ball lens, an aspheric lens with one or more convex, planar and/or concave surfaces, etc.) can be used. Such other lenses may have two or more flat sides that are parallel and/or orthogonal to the other side(s) of the lens to function as a type of lens holder, thereby increasing the accuracy and/or precision of the placement of the lens in the optical mount 20 and/or increasing the surface area for adhesion between the lens and the optical mount 20, but the invention is not limited to such lenses.

The first bar or extension 22 includes a first surface 23a on which the mirror 30 is mounted or fixed. The second bar or extension 24 includes an alternative first surface 23b on which the mirror 30 is mounted or fixed. In the example subassembly 10 shown in FIGS. 1A-B, one of the surfaces 23a-b can serve as the first surface, and the other of the surfaces 23a-b can serve as a third surface, where the first and third surfaces 23a and 23b may be coplanar and may support the mirror 30. The second bar or extension 24 also includes a second surface 27a configured to contact the lens holder 40 or a side surface of the lens 42, and the third bar or extension 26 may include an alternative second surface 27b configured to contact an opposite surface of the lens holder 40 or side surface of the lens 42. In one embodiment where the lens 42 and optionally the lens holder 40 are "press-fit" between the second and third bars or extensions 24 and 26, one of the surfaces 27a-b can serve as the second surface, and the other of the surfaces 27a-b can serve as a fourth surface. In a further embodiment, a surface of the lens holder 40 (or side surface of the lens 42) between the surfaces in contact with the either or both of the second surfaces 27a-b may contact and/or be adhered to a surface of the support structure 28, which may serve as an alternative fourth surface.

In an alternative embodiment, the base 25 of the optical mount 20 may comprise the third bar or extension 26 and optionally the second bar or extension 24, in which case the second (and optionally the fourth) surface(s) 27a and/or 27b are in a cutout or opening in the base. In a further alternative embodiment, the optical mount 20 further comprises a second support structure similar or identical to the support structure 28, but on the opposite ends of the first, second and third bars or extensions 22, 24 and 26 (or the opposite end of the first bar or extension 22 and the end of the base 25 when the base includes at least the second bar or extension 24). The second support structure adds mechanical support to the bars or extensions, and thus to the mirror 30 and lens 42 as well (although it may be more challenging to fit the lens 42 and lens holder 40 into the opening in the base or between the second and third bars or extensions 24 and 26, especially in a "press-fit"-type embodiment).

In some embodiments, the optical subassembly may further comprise a filter, such as a highpass, lowpass or bandpass filter (not shown). For example, the filter may be mounted on or affixed to surfaces of the base 25 and the first bar or extension 22 opposite from the surfaces on which the mirror 30 is mounted. Alternatively, when the second and third bars or extensions 24 and 26 are taller, deeper or thicker, the filter may be mounted on or affixed to a surface of each of the second and third bars or extensions 24 and 26 (e.g., either above or below the lens 42).

The optical mount 20 secures the lens holder 40 and/or the lens 42 at an angle that reduces the reflectance of an incoming optical signal (e.g., from the lens 42), thereby reducing potential interference from reflected light in the optical cavity and/or improving the reliability and/or accuracy of an optical or optoelectronic receiver processing the optical signal. For example, the optical mount 20 is configured to position and/or arrange the second surface(s) 27a-b at a predetermined angle that, in turn, supports and/or secures the lens holder 40 and/or the lens 42. The predetermined angle in this case may be defined as the angle of the optical axis of the lens 42 with respect to (i) a plane that is orthogonal to the incoming optical signal (prior to reflection by the mirror), or (ii) an axis that is orthogonal to a plane (e.g., a horizontal plane) defined by a lower surface of the optical mount 20 or the optical cavity on which the optical mount 20 and/or the target is mounted or fixed. The angle of the lens 42 and/or lens holder 42 may also be adapted to reduce a reflectance of the incoming optical signal. For example, the predetermined angle may be from 5° to 30° with respect to (i) the plane that is orthogonal to the incoming optical signal prior to reflection by the mirror 30 or (ii) the axis that is orthogonal to a plane defined by a lowermost and/or horizontal surface of the optical mount 20.

In addition, the first surface(s) 23a-b of the optical mount 20 may be at a third predetermined angle that is related to the angle at which the incoming optical signal is reflected by the mirror 30. For example, the third predetermined angle may be from 30° to 43° (i.e., [90-47]° to 90-60]° with respect to the incoming optical signal, and the angle at which the incoming optical signal is reflected may be 2×(90° minus the third predetermined angle).

Figure 2A:
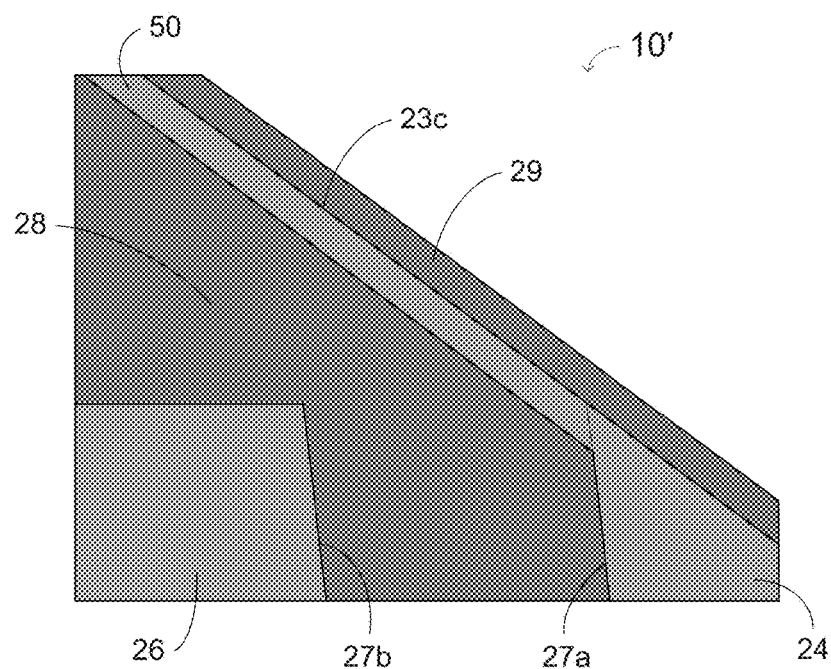
FIGS. 2A-B are top-down and end views of an alternative embodiment of the present optical subassembly.
Figure 2B:
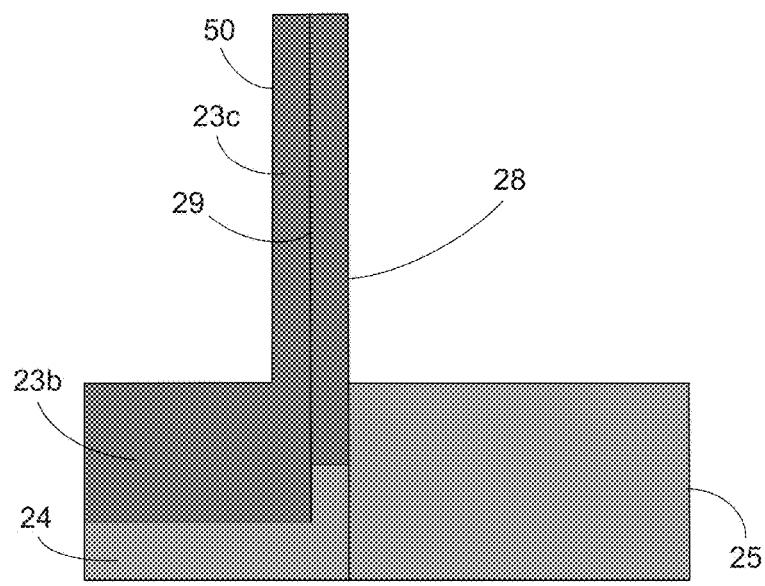

FIGS. 2A-B show another exemplary optical mount 20' that includes the base 25, the support structure 28 orthogonal to the base 25, and the second and third bars or extensions 24 and 26 that are orthogonal to the support structure 28 and that are on an opposite side of the support structure 28 from the base 25. The optical mount 20' includes a ridge or extension 50 that includes a first surface 23c on which the mirror 30 may be mounted or fixed. The alternative first surface 23b on the second bar or extension 24 may be considered part of a single first surface 23b-c. Alternatively, there may be a gap between the ridge or extension 50 and the second bar or extension 24. Similar to the example subassembly 10 shown in FIGS. 1A-B, one of the surfaces 23b-c in the exemplary optical mount 20' can serve as the first surface, and the other of the surfaces 23b-c can serve as a coplanar third surface. Alternatively, the ridge or extension 50 may be omitted entirely.

As shown in FIGS. 2A-B, the lens and lens holder (see 40-42 in FIGS. 1A-B) may not be able to make contact with the surface of the support structure 28 between the second surface(s) 27a-b, as part of the ridge or extension 50 occupies some of the space that the lens and/or lens holder would occupy if the lens and/or lens holder were to make contact with the surface of the support structure 28. In such a case, the lens and/or lens holder contacts only one or both of the second surface(s) 27a-b. However, a gap between the ridge or extension 50 and the second bar or extension 24 can provide the space for the lens and/or lens holder to contact the surface of the support structure 28, if desired.

An Exemplary Optoelectronic Receiver

Figure 3A:
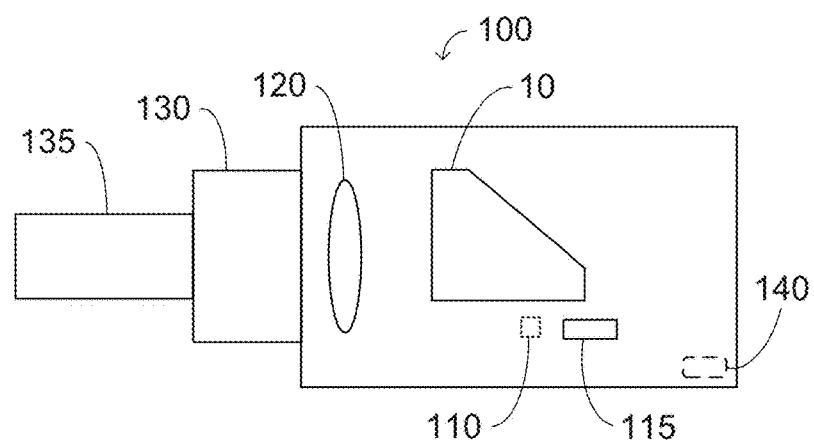
FIGS. 3A-B are side and top-down views of an exemplary optoelectronic receiver with the exemplary optical subassembly of FIG. 1 therein, in accordance with one or more embodiments of the present invention.
Figure 3B:
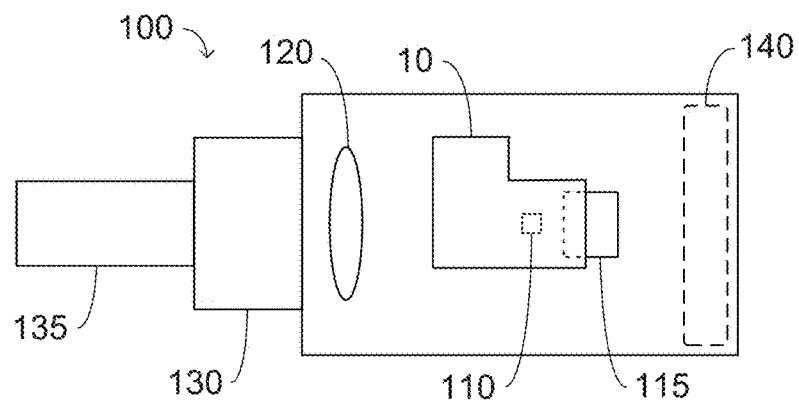

FIGS. 3A-B show side and top-down views, respectively, of an exemplary optoelectronic receiver 100 with the present optical subassembly (e.g., the exemplary optical subassembly 10) therein. The optoelectronic receiver 100 includes a photodetector 110, an amplifier 115 and a plurality of leads 140 within an optical cavity (not shown) configured to contain or enclose the optical subassembly 10, the photodetector 110, the amplifier 115 and the leads 140. The photodetector 110 and the amplifier 115 may be on the planar (e.g., horizontal) floor or a lowermost surface of the optical cavity. The optical cavity may be capped with a sealing cap or window. The optoelectronic receiver 100 further includes a connector socket 130 and a fiber connector 135.

The photodetector 110 is generally configured to convert the incoming optical signal to an electrical signal. In general, the photodetector 110 comprises a photodiode. In various embodiments, the photodiode may have a relatively small area (e.g., ≤25 µm², ≤20 µm², ≤15 µm², etc.) and/or be optimized to receive light having a predetermined wavelength (e.g., in the range of 1200-1700 nm, such as 1270 nm, 1310 nm, 1550 nm, 1577 nm, etc., or in the range of 800-2000 nm, such as 850 nm and the previously mentioned wavelengths).

The amplifier 115 is configured to amplify the electrical signal from the photodetector 110 for transmission over one or more of the leads 140 in an electrical interface (e.g., to a host device). The amplifier 115 may comprise, for example, a circuit board such as a printed circuit board (PCB) with a transimpedance amplifier (TIA) and optionally a limiting amplifier thereon. The photodetector 110 may also be mounted or otherwise included on the PCB. The TIA generally receives the electrical signal from the photodetector 110, and the limiting amplifier further amplifies the amplified electrical signal from the TIA for transmission to an external device (e.g., the host device). In some embodiments, the amplifier may further comprise one or more electrical filters (e.g., lowpass, highpass, and/or bandpass filters).

The connector socket 130 is configured to receive and securely hold the fiber connector 135. The fiber connector 135 may further includes an optional coupling ring or flange (not shown) configured to facilitate placement of the fiber connector 135 in the connector socket 130 and/or adjustment of the position of the fiber connector 135 in the connector socket 130 (e.g., during focusing). Thus, the fiber connector 135 may have an outer diameter and/or circumference about equal to or very slightly greater than the inner diameter or circumference of the connector socket 130. The fiber connector 135 may be or comprise a conventional SC, LC, FC, FJ, APC or Straight Tip/Bayonet Fiber Optic connector. Alternatively, the fiber connector 135 may be or comprise a conventional MT-RJ connector.

The housing of the optoelectronic receiver 100 may further comprise a connector adapter configured to secure the connector socket 130 to the housing of the optoelectronic receiver 100. The connector adapter may contain an optical filter and/or a lens. The optical filter may comprise an optical lowpass, highpass and/or bandpass filter.

The optical or optoelectronic receiver 100 further comprises a fiber adapter or connector 135 that is configured to receive an optical fiber (not shown). The optical fiber may provide the incoming optical signal from a network. In an alternative embodiment, the optical or optoelectronic receiver 100 is part of an optical or optoelectronic transceiver, and the optical fiber may receive an outgoing optical signal from a transmitter (such as a laser diode) in the transceiver, in which case the mirror 30 may be a highpass, lowpass, or bandpass filter that reflects light having a wavelength or wavelength band of the incoming optical signal and is transparent or substantially transparent to light having a wavelength or wavelength band of the outgoing optical signal. The fiber adapter or connector 135 may include a ferrule adapted to secure a fiber stub therein. The fiber stub generally fits securely within the end of the fiber adapter or connector 135 that is inserted into the connector socket 130.

Figure 4:
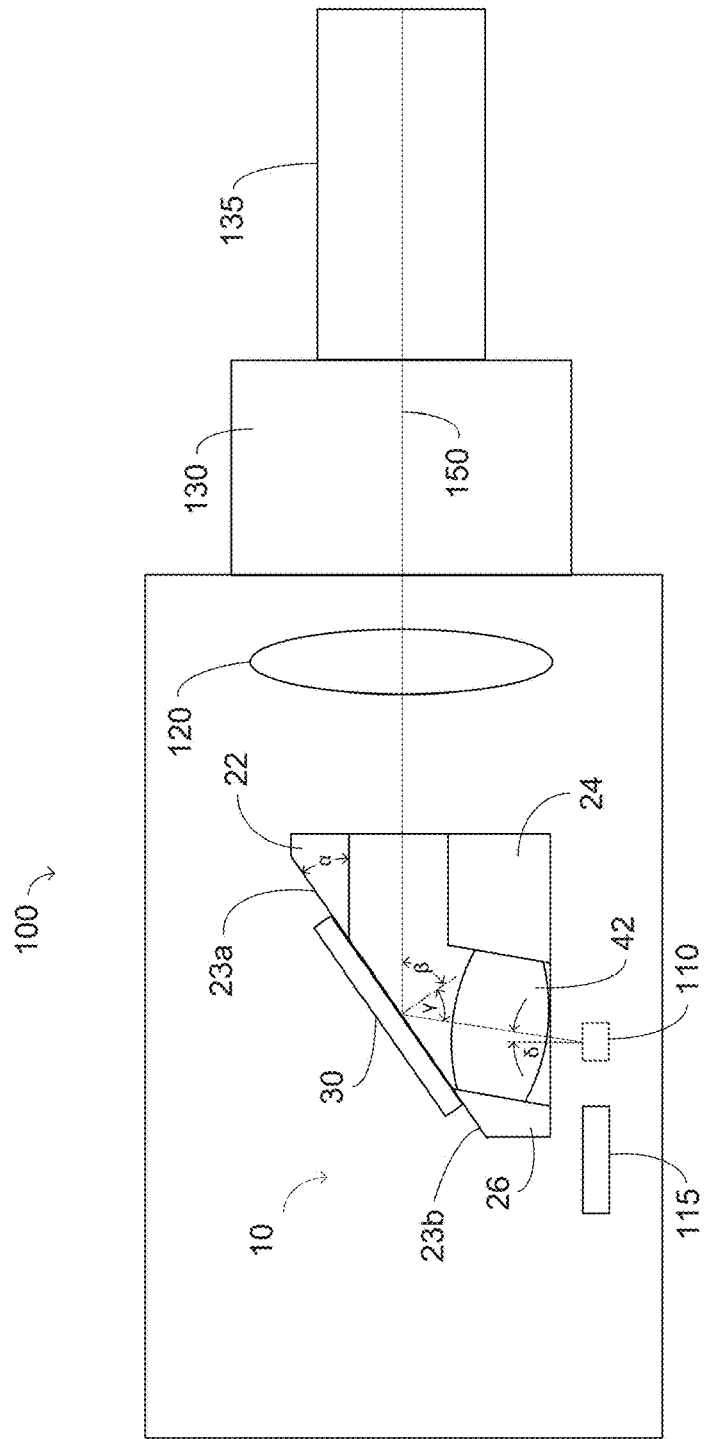
FIG. 4 is a side view of an exemplary optoelectronic receiver showing various angular relationships of components in the present optical subassembly in accordance with one or more embodiments of the present invention.

FIG. 4 is a side view of the exemplary optoelectronic receiver 100 of FIGS. 3A-B showing various angular relationships of components and/or signal(s) therein in accordance with the present invention. For example, an optical signal 150 passes through the fiber adapter or connector 135, the connector socket 130, and the lens 120 prior to being reflected by the mirror 30. The lens 120 may collimate the optical signal 150 and/or focus the optical signal 150 onto a location on the mirror 30. There may be an ideal distance between the end of a fiber stub in the fiber adapter or connector 135 and the lens 120 that can be determined empirically or by experimentation.

The first surfaces 23a and 23b may be coplanar and at an angle α with respect to the incoming optical signal 150. Thus, the third predetermined angle may be defined as or represented by α. In embodiments of the optical subassembly, the angle α is from 30° to 43° (i.e., [90-47]° to [90-60]°) with respect to the incoming optical signal 150. In various examples, the angle α may be in the range 35°-42°, 38°-41°, or any value or range of values between 30° and 43°. This results in the light signal having an angle of reflectance (e.g., β+γ) of about 2×(90°−α) (e.g., 94° to 120°, 96°-110°, 98°-104°, etc.). Thus, the first predetermined angle may be defined as or represented by β+γ.

When the upper surface of the photodiode 110 is parallel with the incoming optical signal 150, the angle of incidence δ of the reflected optical signal onto the photodiode 110 is β+γ−90° (e.g., 4° to 30°, 6° to 20°, 8° to 14°, etc.). The optical axis of the lens 42 should be at the same angle as the angle of incidence δ of the reflected optical signal. Thus, the second predetermined angle may be defined as or represented by δ, and the second surface(s) of the optical mount 20 may be at the angle β+γ, parallel with the reflected optical signal. In one example, the angle β+γ is 100°, and the angle of incidence δ is 10°. In alternative embodiments, α may be >45° (e.g., 47-60°) as long as a non-zero δ is achieved or provided. For example, if α=50°, then β+γ=80°, and δ=10°.

The present optical mount, mirror and lens reduce reflectance of the optical signal in the optical cavity to <5%. When the angles β and γ are 50° and the angle of incidence δ is 10°, reflectance of an optical signal having a wavelength of 1550 nm is reduced to <1%. Similar results can be obtained for other angles β+γ and δ, as well as other wavelengths of light (e.g., 1310 nm).

An Exemplary Optical Transceiver and/or Optical Module

Another aspect of the present invention relates to an optical or optoelectronic transceiver, comprising the present optical or optoelectronic receiver, an optical or optoelectronic transmitter configured to generate an outgoing optical signal, and a second optical subassembly configured to output the outgoing optical signal through the fiber adapter or connector. The present invention may further relate to an optical or optoelectronic module that comprises the present optical or optoelectronic receiver or transceiver.

Figure 5:
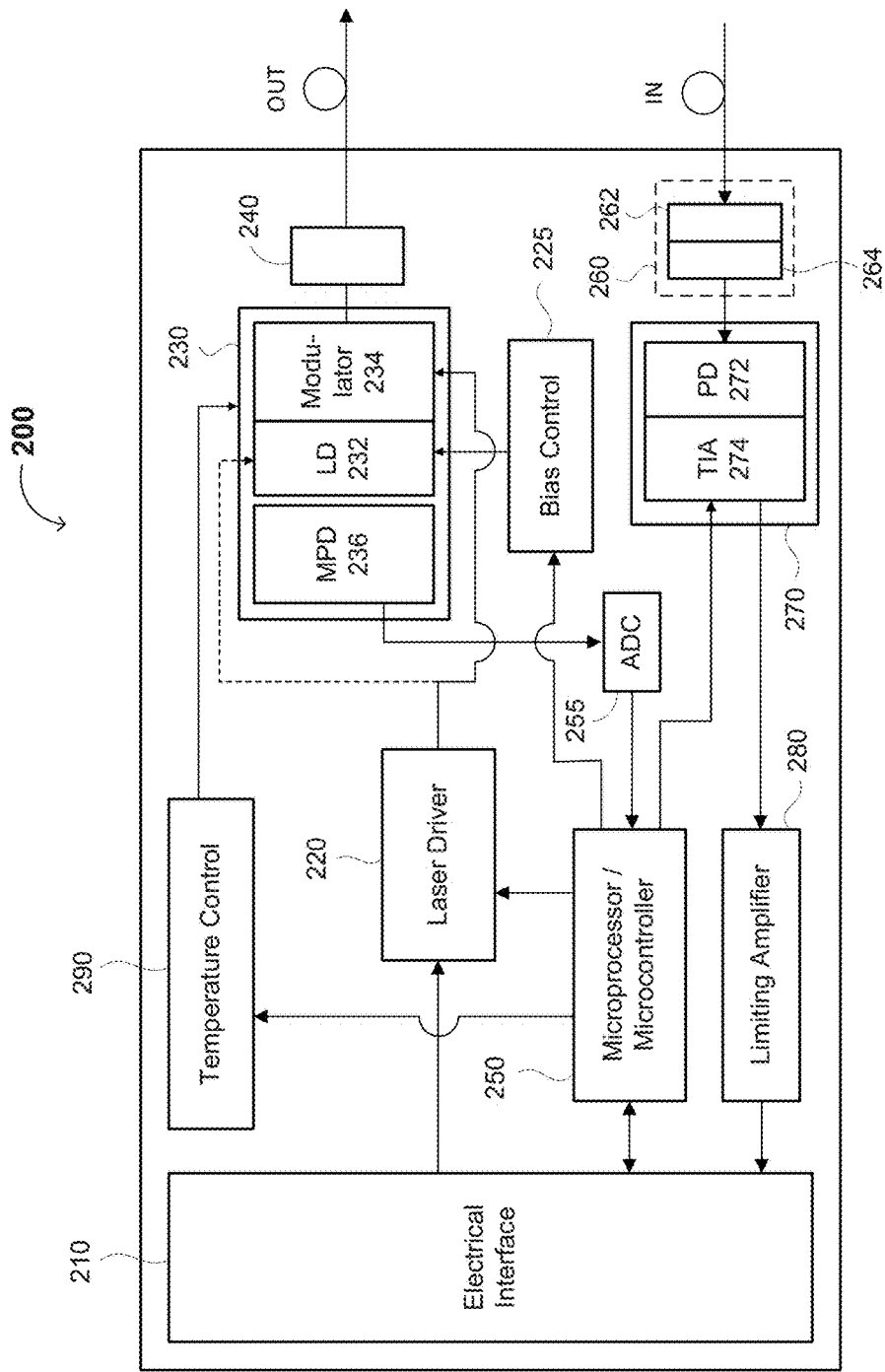
FIG. 5 is a diagram showing components in an exemplary optoelectronic transceiver and/or module in accordance with embodiments of the present invention.

FIG. 5 is a diagram of an exemplary optical transceiver and/or optical module 200 in accordance with embodiments of the present invention comprises an electrical interface 210, one or more laser drivers 220, a transmitter optical subassembly (TOSA) 230, transmitter optics 240, a microprocessor or microcontroller (e.g., MCU) 250, receiver optics 260, a receiver optical subassembly (ROSA) 270, a limiting amplifier 280, and a temperature control circuit 290. The TOSA 230 comprises a laser diode (LD) 232, a modulator 234 and a monitoring photodiode (MPD) 236. The ROSA 270 generally includes a photodiode (PD) 272 configured to receive an optical signal from a network (e.g., sent over an optical fiber) and convert the optical signal to an electrical signal, and optionally, a transimpedance amplifier (TIA) 274 configured to amplify the electrical signal. The limiting amplifier 280 is configured to amplify the signal received from the ROSA 270.

In the transmitter path of the optical transceiver and/or module 200, the laser driver 220 receives an electrical data signal from the electrical interface 210 and sends a data driving signal or pulse to the modulator 234. The electrical interface 210 may receive the data signal from a host device and may comprise, for example, a conventional golden finger connector. The LD 232 receives a bias signal or voltage from the bias control circuit 225. Alternatively, the LD 232 may receive the data driving signal or pulse directly from the laser driver 220, in which case the modulator 234 may not be needed. The MPD 236 is connected to the MCU 250 via an analog-to-digital converter (ADC) circuit or module 255. Thus, the MCU 250 may receive a digital signal (e.g., a voltage) corresponding to the value of a feedback current from the MPD 236, which may be useful for comparing to one or more thresholds or voltages representative of a target and/or maximum value of the operating range of the laser driver 220. The MPD 236, analog-to-digital converter 255, MCU 250 and laser driver 220 may form an automatic power control (APC) regulating loop for maintaining a target optical output power from the LD 232.

The TOSA 230 (i.e., either the modulator 234 or the LD 232) outputs an optical signal through the transmitter optics 240. In various embodiments, the transmitter optics 240 includes one or more lenses, one or more filters, and/or one or more mirrors, as is known in the art. The transmitter optics 240 may further include one or more waveplates and/or optical isolators when the optical signal is polarized.

In the receiver path of the optical transceiver and/or module 200, the receiver optics 260 comprises a mirror 262 and a lens 264 on an optical mount, such as is shown in and described with respect to FIGS. 1A-B, 3A-B and 4. In further embodiments, the receiver optics 260 may further include a filter, as described herein. The PD 272 receives the incoming optical signal and converts it into an electrical signal that is amplified by the TIA 274. The amplified electrical signal output by the TIA 274 may then be further amplified by the limiting amplifier 280 prior to transmission through the electrical interface 210 (e.g., to the host).

The MCU 250 controls the power of the data signal from the laser driver 220, the voltage or current of the bias signal provided by the bias control circuit 225, and the gain(s) of the TIA 274 and/or limiting amplifier 270. The MCU 250 also controls the temperature control circuit 290, which in turn controls the temperature of the LD 232 and optionally the modulator 234. Generally, the temperature of the LD 232 and the modulator 234 may be controlled by regulating the power supplied to them (e.g., when the temperature of the LD 232 is too high, the bias from the bias control circuit may be reduced, and when the temperature of the LD 232 is too low, the bias from the bias control circuit may be increased). The same or different temperature control circuit may control the temperature of the PD 272.

An Exemplary Optical Subassembly for a Multi-Channel Receiver

Figure 6A:
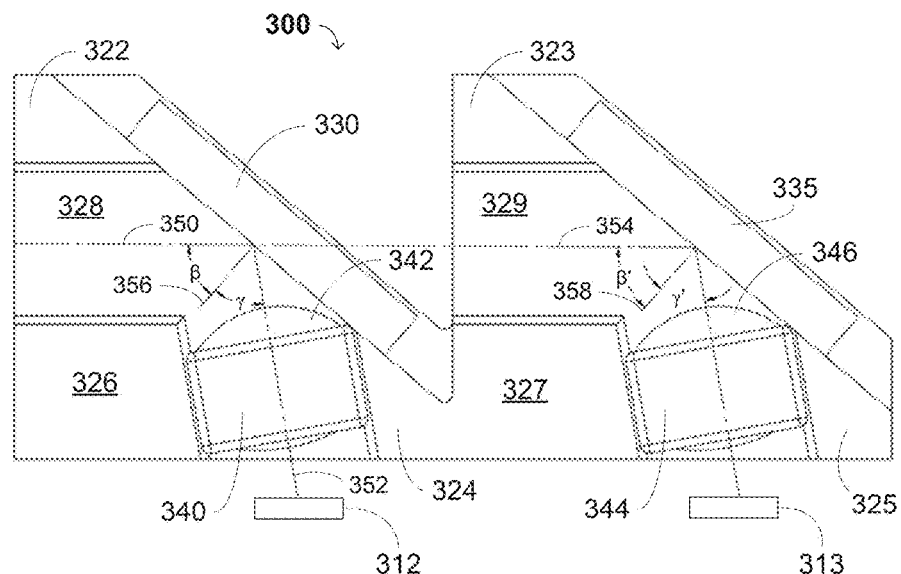
FIGS. 6A-C are different views of an exemplary optical subassembly for a multi-channel optical or optoelectronic receiver in accordance with embodiments of the present invention.
Figure 6B:
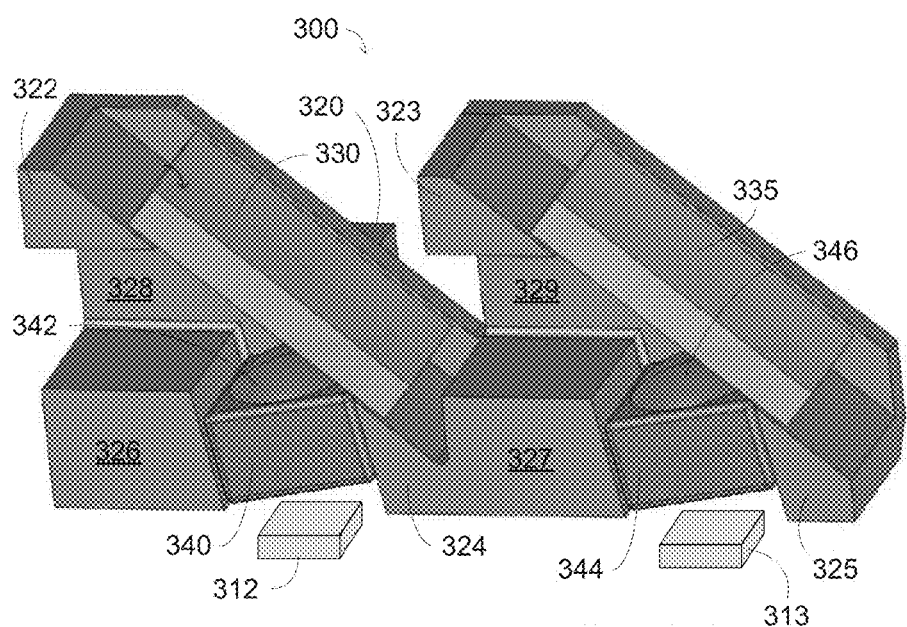
Figure 6C:
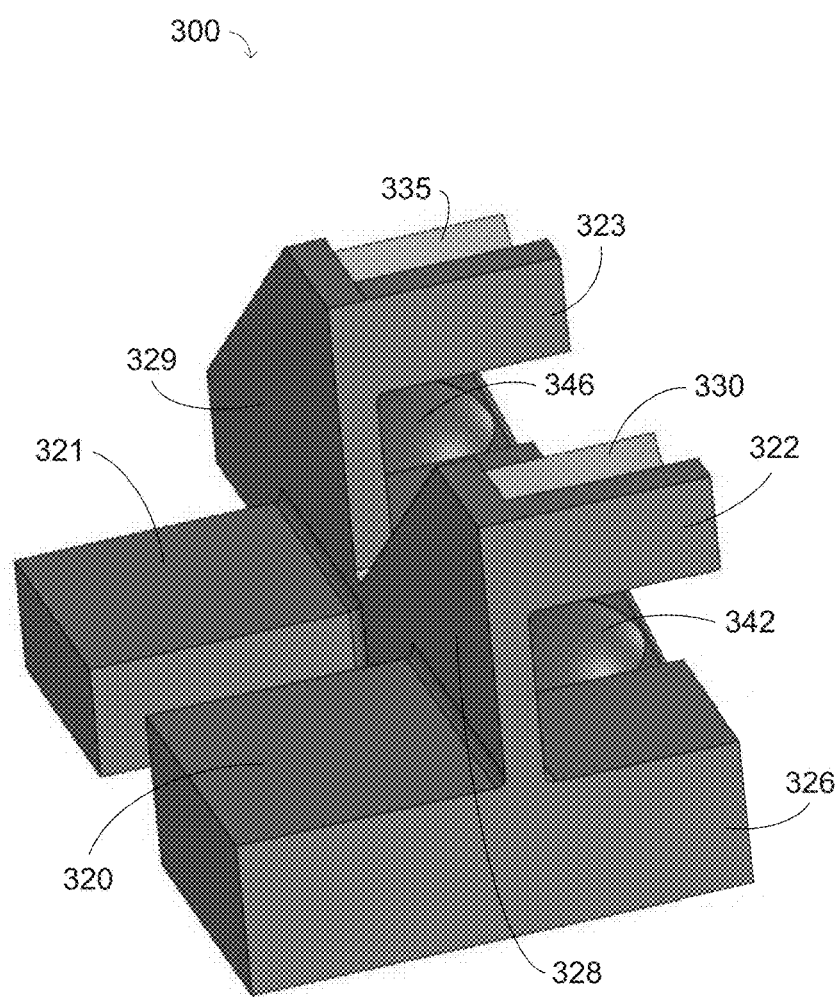

FIGS. 6A-C show an exemplary optical subassembly 300 for a multi-channel receiver that includes first and second bases 320 and 321 (FIG. 6C only), first and second support structures 328 and 329 orthogonal to the bases 320 and 321, first through third bars or extensions 322, 324 and 326 that are orthogonal to the support structure 328 and that are on an opposite side of the support structure 328 from the base 320, and fourth through sixth bars or extensions 323, 325 and 327 that are orthogonal to the support structure 329 and that are on an opposite side of the support structure 329 from the base 321. The first base 320, the first support structure 328 and the first through third bars or extensions 322, 324 and 326 form a first optical mount for a filter 330 and a first lens 342. The second base 321, the second support structure 329 and the fourth through sixth bars or extensions 323, 325 and 327 form a second optical mount for a mirror 335 and a second lens 346. The lenses 342 and 346 are as described with respect to the lens 42 in FIGS. 1A-B.

The filter 330 is configured to reflect a first part 352 (FIG. 6A only) of an incoming optical signal 350 at a first predetermined angle 2α and allow a second part 354 of the incoming optical signal 350 to pass through to the mirror 335. In one case, the first part 352 of the incoming optical signal 350 has a wavelength or wavelength band above a first threshold wavelength, and the second part 354 of the incoming optical signal 350 has a wavelength or wavelength band below a second threshold wavelength, where the second threshold wavelength is less than the first threshold wavelength. Alternatively, the first part 352 of the incoming optical signal 350 has a wavelength or wavelength band below a first threshold wavelength, and the second part 354 of the incoming optical signal 350 has a wavelength or wavelength band above a second threshold wavelength, where the second threshold wavelength is greater than the first threshold wavelength. The first part 352 of the incoming optical signal 350 is reflected towards the lens 342, which is configured to focus the first part 352 of the incoming optical signal 350 onto a photodetector (e.g., photodiode) 312.

The angle β of an axis 356 normal to the surface of the filter 330 relative to the incoming optical signal 350 is adapted to reduce a reflectance of the incoming optical signal 350. For example, the angle β may be from 47° to 60° with respect to the incoming optical signal 350, and the angle β+γ at which the first part 352 of the incoming optical signal 350 is reflected may be from 94° to 120°. More particularly, β may be 50°±x° (where 0≤x ≤3).

In addition, surfaces of the second and third bars or extensions 324 and 326 that contact the lens holder 340 secure the lens holder 340 at an angle that reduces the reflectance of the first part 352 of the incoming optical signal 350 from the lens 342 and/or the photodetector 312, thereby reducing potential interference from reflected light in the optical cavity and/or improving the reliability and/or accuracy of an optical or optoelectronic receiver processing the first part 352 of the optical signal 350. In a further embodiment, a side surface of the lens holder 340 between the surfaces of the lens holder 340 in contact with the second and third bars or extensions 324 and 326 may contact and/or be adhered to a surface of the support structure 328.

The mirror 335 is configured to reflect the second part 354 of the incoming optical signal 350 at a second predetermined angle β' that may be the same as or different from the first predetermined angle β. For ease of manufacturing and use, β' is the same as β. The mirror 335 generally comprises a non-selective (or total reflectance) mirror configured to reflect all or substantially all of the wavelengths of the second part 354 of the incoming optical signal 350. For example, the mirror 335 may be configured to reflect the second part 354 of the incoming optical signal 350 towards the lens 346 and/or a second photodetector (e.g., photodiode) 313. As for the mirror 30 in FIGS. 1A-B, in various embodiments, the mirror 335 comprises a metallic film or surface on a structural block having square or rectangular sides, or a solid piece of a reflective material. The mirror 335 generally has length and width dimensions of about 1 cm or less (e.g., from 2 to 8 mm) and a thickness of about 3 mm or less (e.g., from 0.2 to 2 mm).

Surfaces of the fifth and sixth bars or extensions 325 and 327 that contact the lens holder 344 also secure the lens holder 344 at an angle that reduces the reflectance of the second part 354 of the incoming optical signal 350 from the lens 346 and/or the photodetector 313, thereby reducing potential interference from reflected light in the optical cavity and/or improving the reliability and/or accuracy of an optical or optoelectronic receiver processing the second part 354 of the optical signal 350. In a further embodiment, a side surface of the lens holder 344 between the surfaces of the lens holder 344 in contact with the fifth and sixth bars or extensions 325 and 327 may contact and/or be adhered to a surface of the support structure 329.

The filter 330 is mounted or fixed on coplanar surfaces of the first bar or extension 322 and the second bar or extension 324. The mirror 335 is mounted or fixed on coplanar surfaces of the fourth bar or extension 323 and the fifth bar or extension 325. Other embodiments and/or variations of the multi-channel optical subassembly 300 can be easily derived by those skilled in the art from the description of the optical subassembly 10 in FIGS. 1A-B or elsewhere herein.

Exemplary Methods of Using an Optical Subassembly

Yet a further aspect of the present invention involves a method of processing an optical signal, comprising reflecting an incoming optical signal at a first predetermined angle using a mirror, focusing the incoming optical signal onto a target using a lens configured to receive the incoming optical signal from the mirror, and processing the optical signal at the target. The mirror is supported by first and second surfaces of an optical mount. The lens is supported and/or secured at a second predetermined angle by third and fourth surfaces of the optical mount. The optical mount comprises a structural block configured to position and/or arrange the first and second surfaces at a third predetermined angle related to the first predetermined angle and the third and fourth surfaces at the second predetermined angle. The second predetermined angle is adapted to reduce a reflectance of the incoming optical signal (e.g., from the lens, the target, etc.). The target may be a photodiode. The present method of processing an optical signal reduces the reflectance of the optical signal from the lens and/or other components in the optical cavity and/or optical or optoelectronic receiver, thereby reducing potential interference from reflected light in the optical cavity and/or improving the reliability and/or accuracy of an optical or optoelectronic receiver performing the method.

In certain embodiments, similar to the present optical subassembly, the mirror may be a total reflectance mirror, and the structural block may comprise (i) a base configured to secure the optical mount to an inner surface of an optical cavity and/or (ii) a support structure orthogonal to an upper surface of the base configured to support at least the first surface. The optical mount may comprise a first bar or extension that is orthogonal to the support structure and that comprises the first surface. In one embodiment, the base may comprise the second surface. In additional or alternative embodiments, the third and fourth surfaces may be in a cutout or opening in the base, or the optical mount may comprise second and third bars or extensions that are orthogonal to the support structure and that comprise the second, third and fourth surfaces.

As for the present optical subassembly, the first and second surfaces may be coplanar, and the third predetermined angle is from 47° to 60° with respect to the incoming optical signal. The second predetermined angle may from 5° to 30° with respect to a plane that is orthogonal to the incoming optical signal prior to reflection by the mirror.

In some embodiments, the method may further comprise filtering the incoming optical signal. For example, the incoming optical signal may be filtered before or after reflecting the incoming optical signal or before or after the incoming optical signal passes through the lens. In addition, filtering the incoming optical signal may comprise blocking, absorbing and/or reflecting light having a wavelength above a first predetermined wavelength (e.g., using a lowpass filter), light having a wavelength below a second predetermined wavelength (e.g., using a highpass filter), and/or light having a wavelength above a first predetermined wavelength and below a second predetermined wavelength (e.g., using a bandpass filter). The incoming optical signal may have a predetermined wavelength (e.g., in the range of 1200-1700 nm, such as 1270 nm, 1310 nm, 1550 nm, 1577 nm, etc., or in the range of 800-2000 nm, such as 850 nm and the previously mentioned wavelengths).

In general, the method may further comprise converting the incoming optical signal to an electrical signal (e.g., using a photodetector such as the photodiode), amplifying the electrical signal (e.g., using an amplifier such as a transimpedance amplifier [TIA] and optionally a limiting amplifier), and transmitting the amplified electrical signal over one or more leads and/or an electrical interface (e.g., to a host device). In some embodiments, the method may further comprise electrically filtering (e.g., lowpass, highpass, and/or bandpass filters).

The present optical subassembly, the photodetector, the amplifier(s) and optionally the leads may be contained or enclosed within an optical cavity. The optical cavity may be capped with a sealing cap or window. In general, the incoming optical signal is received through a fiber stub in a fiber connector. The fiber connector may be connected to the optical cavity by a connector adapter and/or a connector socket.

Exemplary Methods of Making an Optical Subassembly

Yet another aspect of the present invention relates to a method of making an optical subassembly, comprising forming an optical mount, mounting or affixing a mirror on first and second surfaces of the optical mount, and mounting, affixing or securing a lens in the optical mount. The lens is configured to receive the reflected incoming optical signal from the mirror and focus the reflected incoming optical signal onto a target. The optical mount comprises (i) first and second surfaces configured to support a mirror, (ii) third and fourth surfaces configured to support and/or secure a lens, and (iii) a structural block configured to position and/or arrange the first and second surfaces at a first predetermined angle and the third and fourth surfaces at a second predetermined angle. The second predetermined angle is adapted to reduce a reflectance of a reflected incoming optical signal (e.g., from the lens and/or other components in an optical or optoelectronic receiver including the optical subassembly, such as the photodetector receiving the focused optical signal). The mirror is configured to reflect an incoming optical signal at a third predetermined angle related to the first predetermined angle.

In various aspects of the method of making an optical subassembly, the first and second surfaces may be coplanar, the third predetermined angle may be from 47° to 60° with respect to the incoming optical signal, and/or the second predetermined angle may be from 5° to 30° with respect to a plane that is orthogonal to the incoming optical signal prior to reflection by the mirror.

The method of making an optical subassembly may comprise placing the optical mount in a location in the optical cavity of an optical or optoelectronic receiver such that the third predetermined angle is from 47° to 60° with respect to the incoming optical signal and the second predetermined angle is from 5° to 30° with respect to a plane that is orthogonal to the incoming optical signal prior to reflection by the mirror, and securing the mirror and lens to the optical mount, and the optical mount to the optical cavity, when the incoming optical signal has at least a predetermined minimum signal strength and/or has a maximum signal strength at the target. Thus, the method may further comprise testing an optical or optoelectronic receiver including the optical subassembly and a photodetector to ensure operability and/or maximize a signal strength(s) of the incoming optical signal. The mirror, lens and optical mount are secured when the optical or optoelectronic receiver is operable and/or the signal strength is maximized.

For example, in the present method of making, the optical mount may be placed in a predetermined position and/or location in the receiver package or housing (e.g., in the optical cavity and/or in the optical path of the incoming optical signal), the mirror and the lens may be placed in predetermined positions and/or locations on the optical mount, and during or after testing, when the signal strength of the incoming optical signal is below a predetermined threshold (or is not at a maximum value), the position and/or location of the optical mount (and optionally, the positions and/or locations of the lens and/or mirror) may be adjusted. The mirror, lens and optical mount are secured when the received signal strength is equal to or above the predetermined threshold or is at the maximum value.

CONCLUSION/SUMMARY

Embodiments of the present invention advantageously provide an optical subassembly, an optical receiver, transceiver and module including the same, and methods for making and using such an optical subassembly. The present optical subassembly reduces reflectance of the incoming optical signal in the optical cavity of an optical or optoelectronic receiver relative to the prior art. In addition, the present optical subassembly enables facile alignment of the incoming optical signal by adjusting a relatively large optical mount containing a lens, rather than the relatively small lens itself.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An optical subassembly, comprising:
   a mirror configured to reflect an incoming optical signal at a first predetermined angle;
   a lens configured to receive the incoming optical signal from the minor and focus the incoming optical signal onto a target; and
   an optical mount comprising:
      a first bar or extension comprising at least one first surface configured to support the mirror,
      at least one second surface configured to support and/or secure the lens at a second predetermined angle, and
      a structural block configured to position and/or arrange (i) the at least one first surface at a third predetermined angle related to the first predetermined angle and (ii) the at least one second surface at the first or second predetermined angle, wherein the first and/or second predetermined angle is adapted to reduce a reflectance of the incoming optical signal, wherein the structural block comprises:
         a base configured to secure the optical mount to an inner surface of an optical cavity and
         a support structure orthogonal to an upper surface of the base and configured to support at least the first surface, wherein the first bar or extension is orthogonal to the support structure.

2. The optical subassembly of claim 1, wherein the mirror is a total reflectance minor.

3. The optical subassembly of claim 1, wherein the at least one second surface is in a cutout or opening in the base.

4. The optical subassembly of claim 1, wherein the optical mount comprises a second bar or extension that is orthogonal to the support structure and that comprises the second surface.

5. The optical subassembly of claim 4, wherein the optical mount further comprises a third bar or extension that is orthogonal to the support structure and that comprises (i) a third surface that is coplanar with the first surface and that is also configured to support the mirror and (ii) a fourth surface that is parallel or perpendicular to the second surface.

6. The optical subassembly of claim 5, wherein the fourth surface is configured to further support and/or secure the lens.

7. The optical subassembly of claim 1, wherein the third predetermined angle is from 30° to 43° with respect to the incoming optical signal.

8. The optical subassembly of claim 1, wherein the first predetermined angle is greater than 90°, and the second predetermined angle is from 5° to 30° with respect to a plane that is orthogonal to the incoming optical signal prior to reflection by the mirror.

9. A multi-channel optical or optoelectronic receiver, comprising:
the optical subassembly of claim 1, configured to process a first channel of the incoming optical signal;
a filter configured to reflect a second channel of the incoming optical signal at a fourth predetermined angle and allow the first channel of the incoming optical signal to pass through; and
a second lens configured to receive the second channel of the incoming optical signal from the filter and focus the incoming optical signal onto a second target;
wherein the optical mount further comprises at least one fifth surface configured to support the filter, at least one sixth surface configured to support and/or secure the second lens at a fifth predetermined angle, and a second structural block configured to position and/or arrange (i) the fifth surface at a sixth predetermined angle related to the fourth predetermined angle and (ii) the sixth surface at the fifth or sixth predetermined angle, wherein the fifth and/or sixth predetermined angle is adapted to reduce a reflectance of the second channel of the incoming optical signal.

10. An optical or optoelectronic receiver, comprising:
the optical subassembly of claim 1;
a photodetector configured to receive the incoming optical signal and convert the incoming optical signal to an electrical signal; and
a package or housing including an optical cavity configured to contain or enclose the optical subassembly and the photodetector.

11. An optical or optoelectronic transceiver, comprising:
the optical or optoelectronic receiver of claim 10;
an optical or optoelectronic transmitter configured to generate an outgoing optical signal; and
a second optical subassembly configured to output the outgoing optical signal through the fiber adapter or connector.

12. A method of processing an optical signal, comprising:
reflecting an incoming optical signal at a first predetermined angle using a mirror;
focusing the incoming optical signal onto a target using a lens configured to receive the incoming optical signal from the mirror; and
processing the optical signal at the target, wherein the mirror is supported by at least one first surface of an optical mount, the lens is supported and/or secured at a second predetermined angle by at least one second surface of the optical mount, the optical mount comprises a structural block configured to position and/or arrange the at least one first surface at a third predetermined angle related to the first predetermined angle and the at least one second surface at the second predetermined angle, wherein the structural block comprises (i) a base configured to secure the optical mount to an inner surface of an optical cavity and (ii) a support structure orthogonal to an upper surface of the base configured to support at least the first surface, the optical mount further comprises a first bar or extension that is orthogonal to the support structure and that comprises the first surface, the base comprises the at least one second surface, the at least one second surface is in a cutout or opening in the base, and the first and/or second predetermined angle is adapted to reduce a reflectance of the incoming optical signal.

13. The method of claim 12, wherein the mirror is a total reflectance mirror, and the target is a photodiode.

14. The method of claim 12, wherein the first predetermined angle is greater than 90°, and the third predetermined angle is from 30° to 43° with respect to the incoming optical signal.

15. The method of claim 12, wherein the incoming optical signal is a multi-channel optical signal, and the method further comprises:
allowing a first channel of the multi-channel optical signal to pass through a filter and reflecting a second channel of the multi-channel optical signal at a fourth predetermined angle;
focusing the second channel of the multi-channel optical signal onto a second target using a second lens; and
processing the second channel of the optical signal at the second target, wherein the filter is supported by at least one third surface of the optical mount, the second lens is supported and/or secured at a fifth predetermined angle by at least one fourth surface of the optical mount, the optical mount comprises a second structural block configured to position and/or arrange the at least one third surface at a sixth predetermined angle related to the fourth predetermined angle and the at least one fourth surface at the fifth predetermined angle, the fifth and/or sixth predetermined angle is adapted to reduce a reflectance of the second channel of the incoming optical signal, and the first channel of the multi-channel optical signal is reflected by the mirror.

16. A method of making an optical subassembly, comprising:
forming an optical mount comprising (i) at least one first surface configured to support a mirror, (ii) at least one second surface configured to support and/or secure a lens, and (iii) a structural block configured to position and/or arrange the at least one first surface at a first predetermined angle greater than 90° and the at least one second surface at a second predetermined angle of from 5° to 30° with respect to a plane that is orthogonal to the incoming optical signal prior to reflection by the mirror, wherein the second predetermined angle is adapted to reduce a reflectance of a reflected incoming optical signal;
mounting or affixing a mirror on the at least one first surface, the mirror being configured to reflect an incoming optical signal at a third predetermined angle related to the first predetermined angle, wherein the third predetermined angle is from 30° to 43° with respect to the incoming optical signal; and
mounting, affixing or securing a lens on the at least one second surface at the second predetermined angle, the lens being configured to receive the reflected incoming optical signal from the mirror and focus the reflected incoming optical signal onto a target.

17. An optical subassembly, comprising:
a mirror configured to reflect an incoming optical signal at a first predetermined angle greater than 90°;
a lens configured to receive the incoming optical signal from the mirror and focus the incoming optical signal onto a target; and
an optical mount comprising at least one first surface configured to support the mirror, at least one second surface configured to support and/or secure the lens at a second predetermined angle from 5° to 30° with respect to a plane that is orthogonal to the incoming optical signal prior to reflection by the mirror, and a structural block configured to position and/or arrange (i) the at least one first surface at a third predetermined angle related to the first predetermined angle and (ii) the at least one second surface at the first or second predetermined angle, wherein the first and/or second predetermined angle is adapted to reduce a reflectance of the incoming optical signal.

18. An optical or optoelectronic receiver, comprising:
the optical subassembly of claim 17;
a photodetector configured to receive the incoming optical signal and convert the incoming optical signal to an electrical signal; and
a package or housing including an optical cavity configured to contain or enclose the optical subassembly and the photodetector.

19. A multi-channel optical or optoelectronic receiver, comprising:
an optical subassembly, configured to process a first channel of the incoming optical signal and comprising:
a mirror configured to reflect an incoming optical signal at a first predetermined angle,
a lens configured to receive the incoming optical signal from the minor and focus the incoming optical signal onto a target, and
an optical mount comprising:
at least one first surface configured to support the mirror,
at least one second surface configured to support and/or secure the lens at a second predetermined angle, and
a structural block configured to position and/or arrange (i) the at least one first surface at a third predetermined angle related to the first predetermined angle and (ii) the at least one second surface at the first or second predetermined angle, wherein the first and/or second predetermined angle is adapted to reduce a reflectance of the incoming optical signal;
a filter configured to reflect a second channel of the incoming optical signal at a fourth predetermined angle and allow the first channel of the incoming optical signal to pass through; and
a second lens configured to receive the second channel of the incoming optical signal from the filter and focus the incoming optical signal onto a second target;
wherein the optical mount further comprises at least one fifth surface configured to support the filter, at least one sixth surface configured to support and/or secure the second lens at a fifth predetermined angle, and a second structural block configured to position and/or arrange (i) the fifth surface at a sixth predetermined angle related to the fourth predetermined angle and (ii) the sixth surface at the fifth or sixth predetermined angle, wherein the fifth and/or sixth predetermined angle is adapted to reduce a reflectance of the second channel of the incoming optical signal.

20. A method of processing a multi-channel optical signal, comprising:
allowing a first channel of the multi-channel optical signal to pass through a filter and reflecting a second channel of the multi-channel optical signal at a first predetermined angle using a mirror;
focusing the second channel of the multi-channel optical signal onto a target using a lens configured to receive the second channel of the multi-channel optical signal from the mirror;
processing the second channel of the multi-channel optical signal at the target, wherein the mirror is supported by at least one first surface of an optical mount, the lens is supported and/or secured at a second predetermined angle by at least one second surface of the optical mount, the optical mount comprises a structural block configured to position and/or arrange the at least one first surface at a third predetermined angle related to the first predetermined angle and the at least one second surface at the second predetermined angle, and the first and/or second predetermined angle is adapted to reduce a reflectance of the second channel of the multi-channel optical signal;
reflecting the first channel of the multi-channel optical signal at a fourth predetermined angle;
focusing the first channel of the multi-channel optical signal onto a second target using a second lens; and
processing the first channel of the multi-channel optical signal at, the second target, wherein the filter is supported by at least one third surface of the optical mount, the second lens is supported and/or secured at a fifth predetermined angle by at least one fourth surface of the optical mount, the optical mount comprises a second structural block configured to position and/or arrange the at least one third surface at a sixth predetermined angle related to the fourth predetermined angle and the at least one fourth surface at the fifth predetermined angle, and the fifth and/or sixth predetermined angle is adapted to reduce a reflectance of the first channel of the incoming optical signal.

\* \* \* \* \*